United States Patent
Choi et al.

(10) Patent No.: US 11,094,940 B2
(45) Date of Patent: Aug. 17, 2021

(54) BINDER HAVING HIGH ADHESION FOR CARBON-COATED LITHIUM IRON PHOSPHATE ELECTRODE, ELECTRODE CONTAINING SAME, AND LITHIUM SECONDARY BATTERY CONTAINING SAME

(71) Applicant: KOREA ADVANCED INSTITUTE OF SCIENCE AND TECHNOLOGY, Daejeon (KR)

(72) Inventors: Jang Wook Choi, Daejeon (KR); Yong Hee Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 173 days.

(21) Appl. No.: 16/466,762

(22) PCT Filed: Dec. 6, 2017

(86) PCT No.: PCT/KR2017/014247
§ 371 (c)(1),
(2) Date: Jun. 5, 2019

(87) PCT Pub. No.: WO2018/110895
PCT Pub. Date: Jun. 21, 2018

(65) Prior Publication Data
US 2020/0067098 A1 Feb. 27, 2020

(30) Foreign Application Priority Data
Dec. 14, 2016 (KR) .................. 10-2016-0170067

(51) Int. Cl.
*H01M 4/62* (2006.01)
*H01M 4/587* (2010.01)
(Continued)

(52) U.S. Cl.
CPC ........ *H01M 4/623* (2013.01); *C08G 18/4854* (2013.01); *C08G 18/7671* (2013.01);
(Continued)

(58) Field of Classification Search
None
See application file for complete search history.

(56) References Cited

U.S. PATENT DOCUMENTS

2008/0081258 A1* 4/2008 Kim .................. C04B 35/62884
429/209
2009/0191442 A1* 7/2009 Hoshikawa ............ C08J 5/2243
429/524

(Continued)

FOREIGN PATENT DOCUMENTS

| JP | 2013-97906 A | 5/2013 |
| JP | 2015-220221 A | 12/2015 |
| KR | 10-1764072 B1 | 8/2017 |

OTHER PUBLICATIONS

JP2013097906 English translation. Shobugawa et al. Japan. May 20, 2013. (Year: 2013).*

(Continued)

*Primary Examiner* — Christopher P Domone
(74) *Attorney, Agent, or Firm* — NSIP Law

(57) ABSTRACT

The present disclosure provides a polymer binder for a secondary battery electrode, which serves as a binder for a carbon-coated lithium iron phosphate (c-LiFePO$_4$) electrode and is a copolymer containing a hard segment capable of hydrogen bonding in the electrode and a soft segment having a polyol structure.

Also, the present disclosure provides a secondary battery electrode and a lithium secondary battery containing the (Continued)

same, wherein a nonaqueous electrolyte solution is applied to an electrode mixture containing the binder for an electrode.

11 Claims, 10 Drawing Sheets

(51) Int. Cl.
    *H01M 4/36*     (2006.01)
    *H01M 4/58*     (2010.01)
    *H01M 10/0525*     (2010.01)
    *C08G 18/48*     (2006.01)
    *C08G 18/76*     (2006.01)
    *C09D 5/24*     (2006.01)
    *C09D 175/08*     (2006.01)

(52) U.S. Cl.
    CPC ............. *C09D 5/24* (2013.01); *C09D 175/08* (2013.01); *H01M 4/366* (2013.01); *H01M 4/587* (2013.01); *H01M 4/5825* (2013.01); *H01M 10/0525* (2013.01)

(56) References Cited

U.S. PATENT DOCUMENTS

2015/0017533 A1*   1/2015   Takahashi .......... C08G 18/0823
                                                          429/217
2015/0056500 A1*   2/2015   Huang ................. H01M 4/483
                                                           429/200

OTHER PUBLICATIONS

Chul Shin, Ho et al., "Electrochemical properties of the carbon-coated LiFePO4 as a cathode material for lithium-ion secondary batteries", *Journal of Power Sources*, vol. 159, 2006 (pp. 1383-1388).

Zhou, Nan et al., "Effect of Carbon Content on Electrochemical Performance of LiFePO4/C Thin Film Cathodes", *International Journal of Electrochemical Science*, vol. 7, 2012 (pp. 12633-12645).

Lee, Yong-Hee et al., "Low Molecular Weight Spandex as a Promising Polymeric Binder for LiFePO4 Electrodes", Advanced Science News, vol. 7, 2017 (pp. 1-8).

International Search Report dated Oct. 16, 2018 in counterpart International Patent Application No. PCT/KR2017/014247 (3 pages in English and 3 pages in Korean).

* cited by examiner

[FIG. 1]
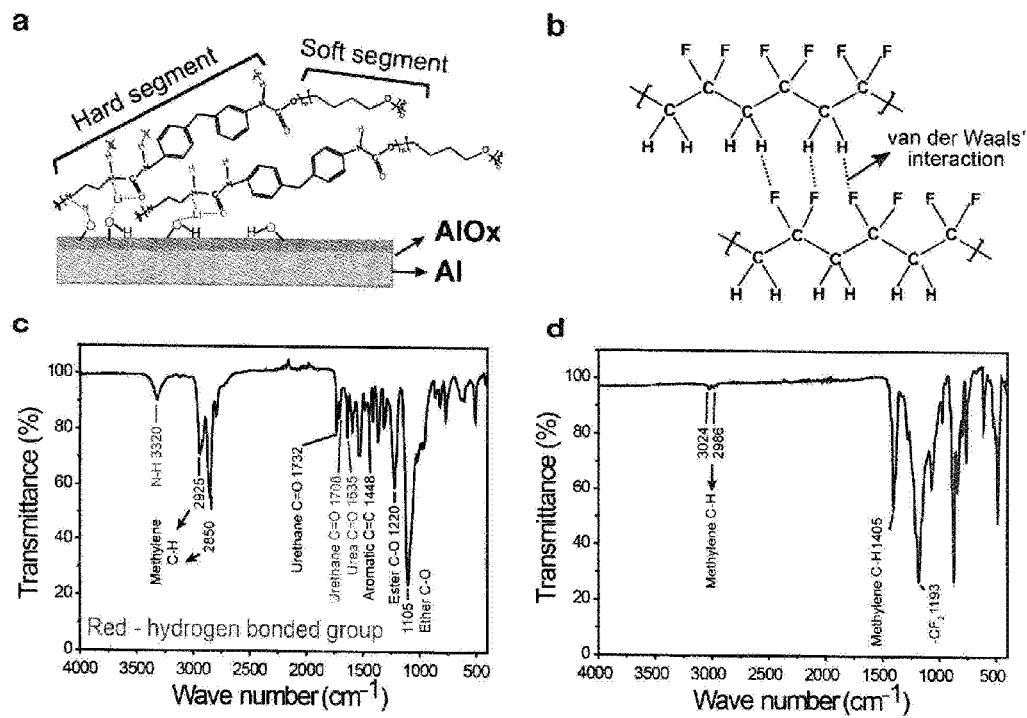

[FIG. 2]
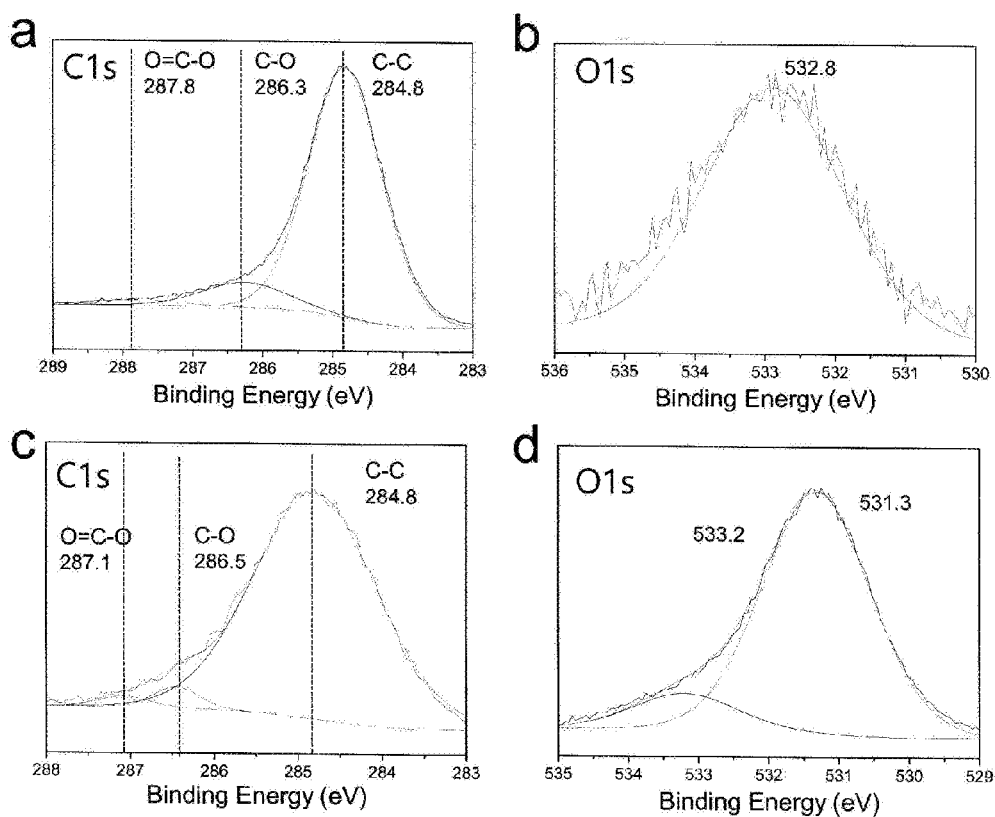

[FIG. 3]
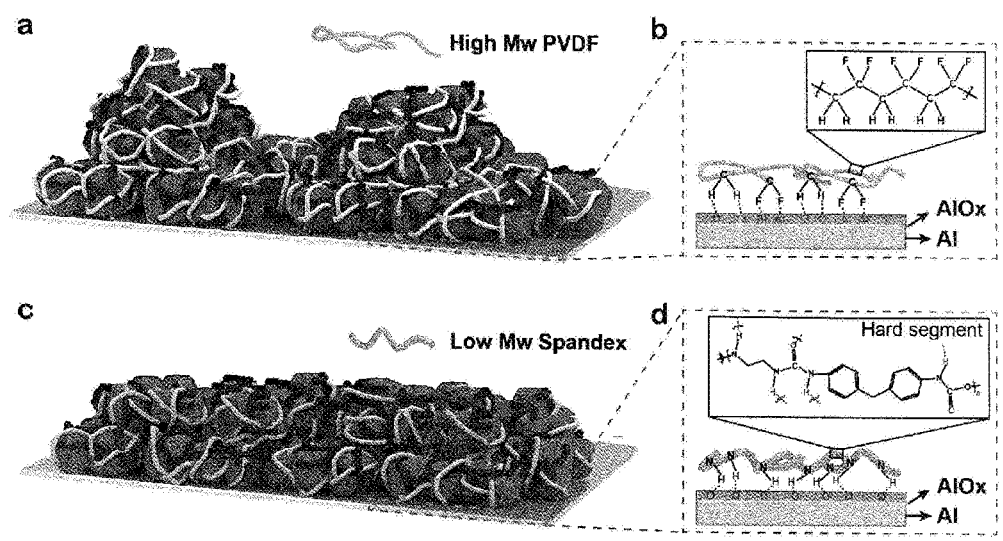

[FIG. 4]
a
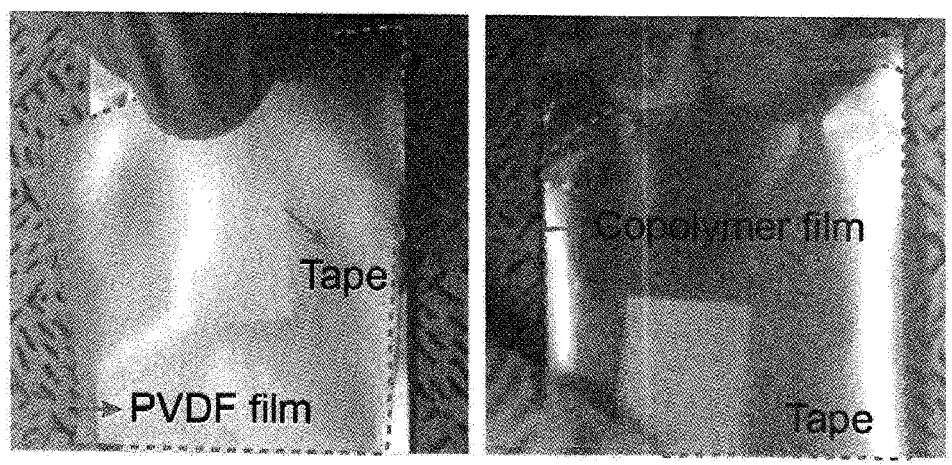
b Cross-sectional view
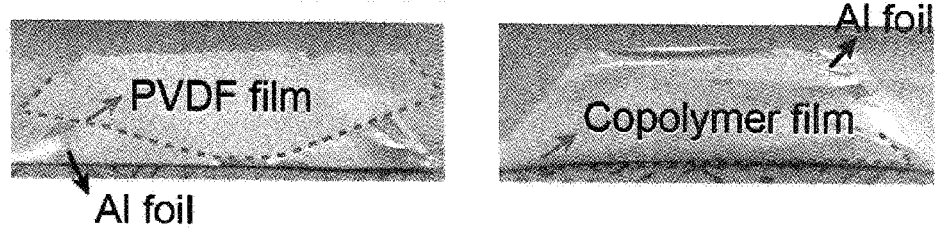

[FIG. 5]
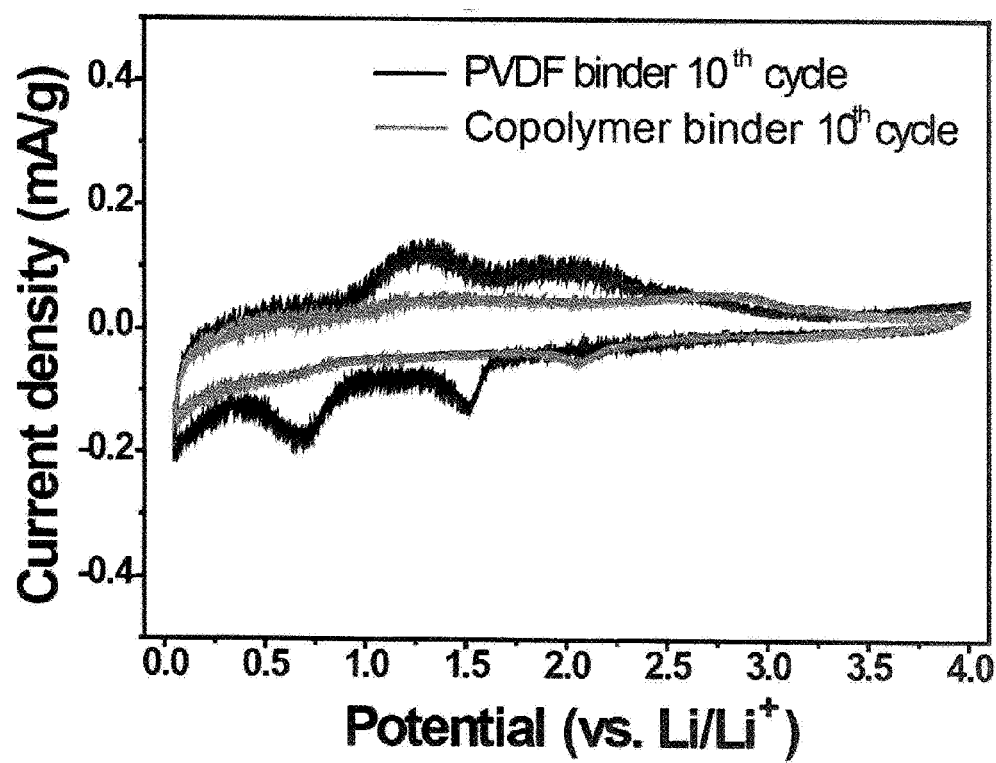

[FIG. 6]
| Binder | Coating thickness, μm (With NMP solvent) | Electrode thickness, μm (After drying) | Areal Loading, mg/cm² (Active material only) |
|---|---|---|---|
| H-PVDF (Mw : 1,000,000) | 300 | 88 | 4.16 |
| L-PVDF (Mw : 300,000) | 300 | 94 | 5.12 |
| Copolymer (Mw : 300,000) | 300 | 100 | 5.64 |
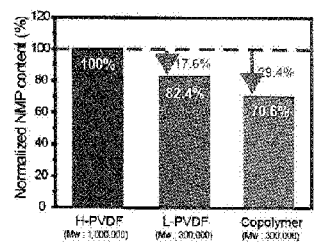

[FIG. 7]
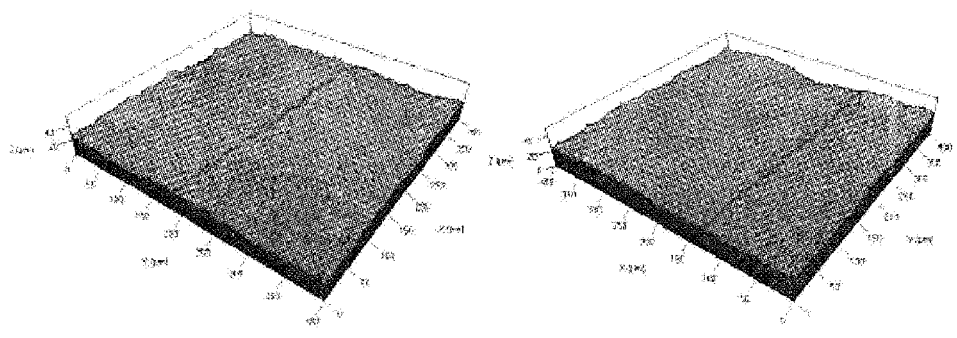
|  | RSa | RSp | RSv | RSz |
|---|---|---|---|---|
| H-PVDF electrode | 3.39 | 15.39 | 15.39 | 29.33 |
| Copolymer electrode | 2.42 | 14.47 | 12.64 | 23.29 |
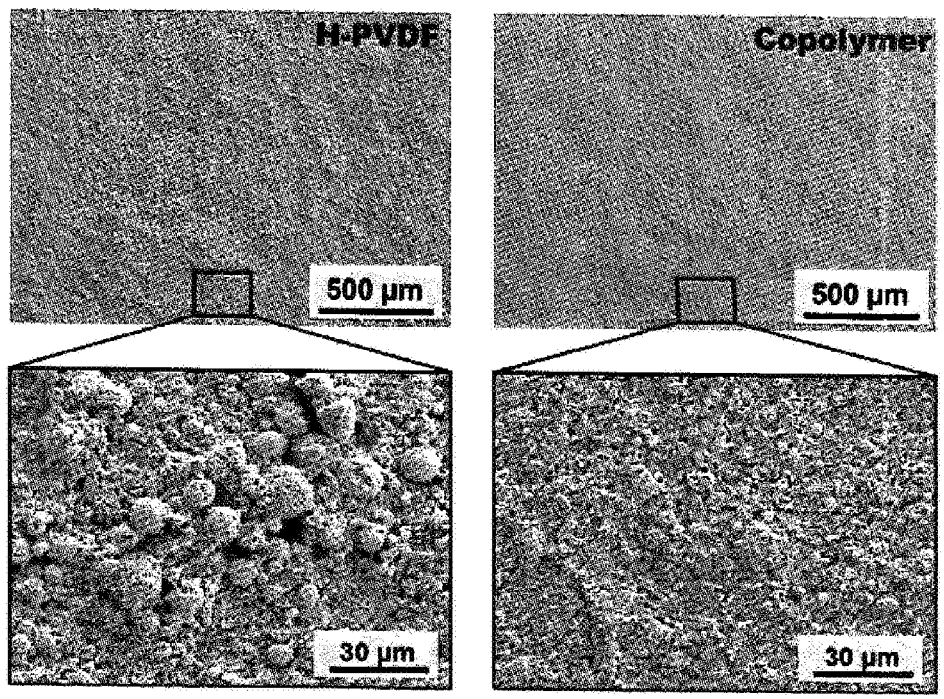

[FIG. 8]
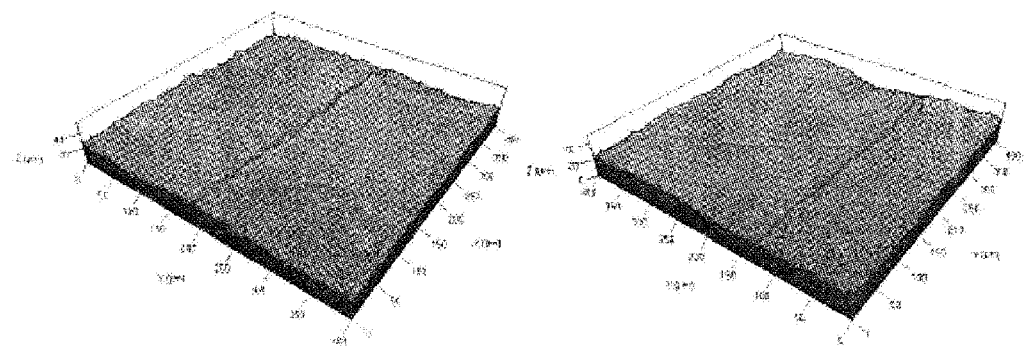
[FIG. 9]
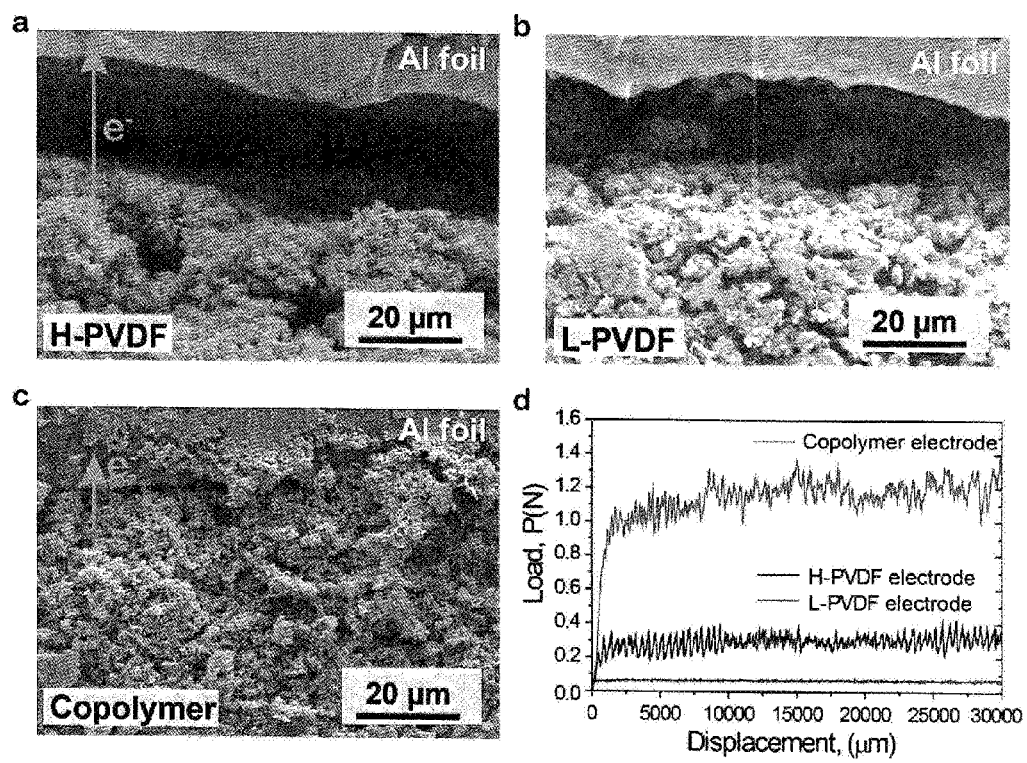

[FIG. 10]
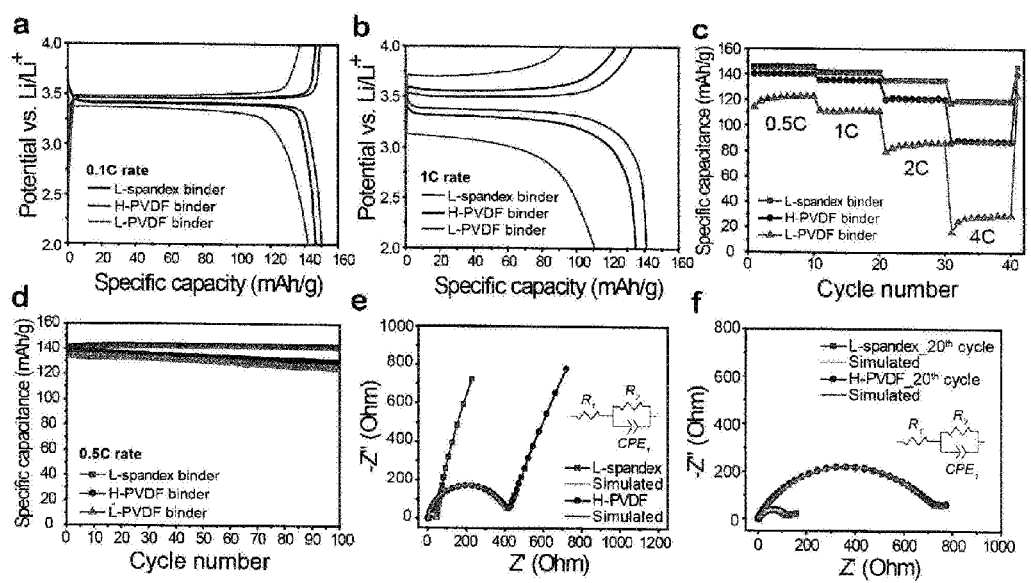

[FIG. 11]
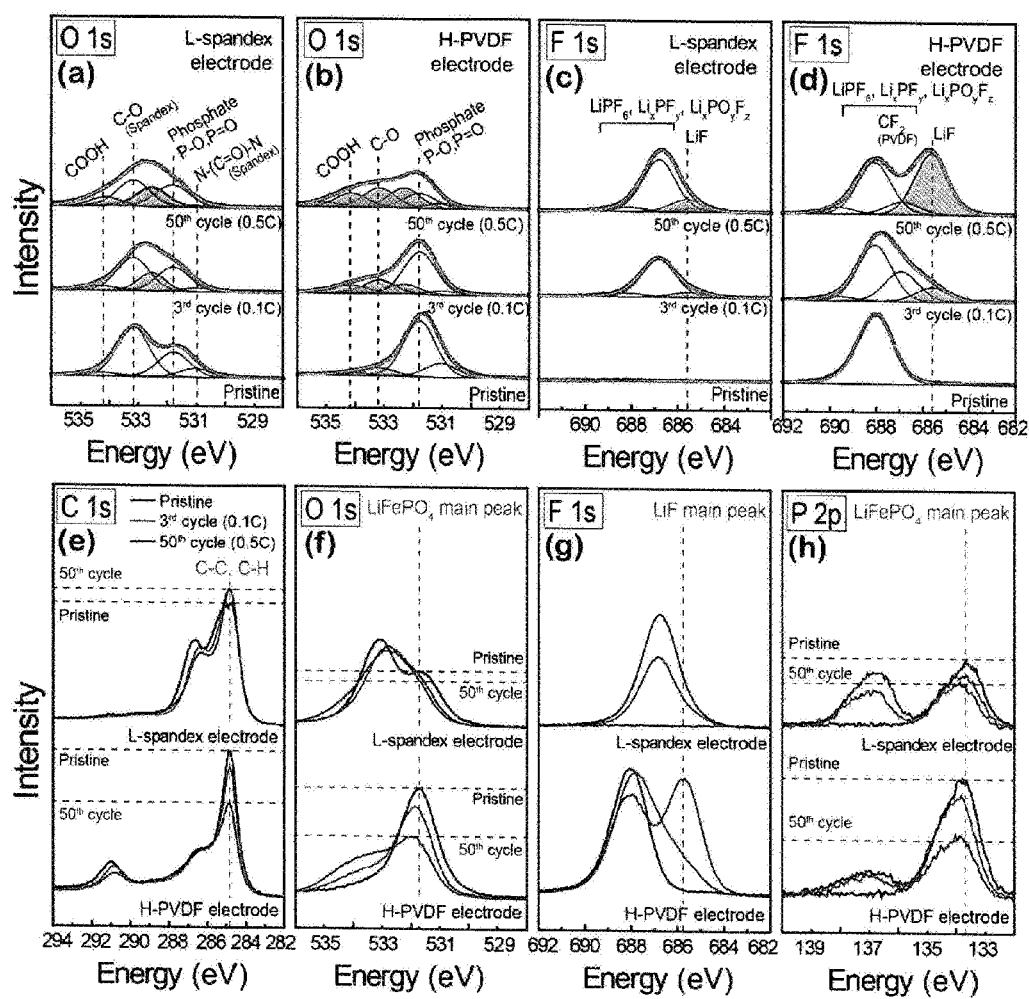

BINDER HAVING HIGH ADHESION FOR CARBON-COATED LITHIUM IRON PHOSPHATE ELECTRODE, ELECTRODE CONTAINING SAME, AND LITHIUM SECONDARY BATTERY CONTAINING SAME

CROSS REFERENCE TO RELATED APPLICATIONS

This application is a U.S. National Stage Application of International Application No. PCT/KR2017/014247, filed on Dec. 6, 2017, which claims the benefit under 35 USC 119(a) and 365(b) of Korean Patent Application No. 10-2016-0170067, filed on Dec. 14, 2016, in the Korean Intellectual Property Office, the entire disclosure of which is incorporated herein by reference for all purposes.

TECHNICAL FIELD

The present disclosure relates to a binder for a lithium iron phosphate (c-LiFePO$_4$) electrode, an electrode containing the same and a lithium secondary battery containing the same. It relates to a copolymer binder containing a hard segment capable of hydrogen bonding with each electrode active material and a current collector and a soft segment having a polyol structure, a binder for a lithium iron phosphate (c-LiFePO$_4$) electrode exhibiting improved output and service life characteristics as compared to when an additive is absent by forming a polycarbonate-based electrode interface film via electrochemical reaction with the copolymer binder, an electrode containing the same and a lithium secondary battery containing the same.

BACKGROUND ART

Due to recent environmental pollution issues, interests in electric vehicles are soaring because they can reduce emission of carbon dioxide and pollutants. In this aspect, it is expected that a lithium secondary battery, which is a key energy source of electric vehicles, will play a very important role in the development of electric vehicles because it has a higher energy density when compared to other energy storage devices.

In particular, lithium iron phosphate is a material which has drawn much attention as a secondary battery positive electrode material for an electric vehicle because of high energy density, low material cost, environmental friendliness, excellent stability, etc. However, the inherently low electrical conductivity of lithium iron phosphate is a major obstacle to commercialization.

Researchers have tried to resolve the low electrical conductivity problem through substitution of heterogeneous elements or synthesis of nano-sized materials. However, the existing approaches are significantly limited in terms of commercialization because a high cost may be required for the material synthesis and electrode density can be low.

Recently, research results that the existing problem can be improved by changing a binder, which is a component of a secondary battery electrode, were published. The binder material is a material having a great impact on the entire electrode performance although it has a low content in the secondary battery electrode. In particular, in the published researches, the performance of a lithium iron phosphate electrode was improved by using an aqueous binder which is environmentally friendly and costs less for processing. However, the use of the aqueous binder can cause the problems of dissociation of lithium ions of a positive electrode material and corrosion of the entire aluminum current collector. This can be a large obstacle to commercialization.

In addition, the currently used commercial PVDF binder based on an organic solvent has the problems of aggregation of active material and low adhesivity to the current collector due to high molecular weight. Therefore, in order to produce a lithium iron phosphate electrode with excellent properties, it is necessary to discover a multifunctional organic solvent-based polymer which is electrochemically stable, is readily applicable to commercial processes, is capable of improving the dispersibility of a slurry and has high adhesion force.

DISCLOSURE

Technical Problem

The present disclosure is directed to developing a binder for improving the performance of a carbon-coated lithium iron phosphate electrode and providing an additive which is capable of forming an interface layer with excellent electrochemical properties by interacting with the binder and a lithium secondary battery containing the same.

Technical Solution

Thus, in order to solve the problems described above, the present disclosure provides a polymer binder for a secondary battery electrode containing carbon-coated lithium iron phosphate (c-LiFePO$_4$), wherein the binder is a copolymer containing a hard segment capable of hydrogen bonding in the electrode and a soft segment having a polyol structure.

The copolymer can form a polycarbonate-based electrode interface film by reacting with a compound of Chemical Formula 1 in an electrolyte solution.

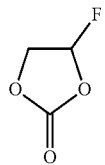

[Chemical Formula 1]

The copolymer may have a number-average molecular weight of 210,000-1,000,000.

The hard segment contains bonds of an aromatic polyurethane and an aromatic urea. As the soft segment, an aliphatic polyol compound having a weight-average molecular weight of 1,000-3,000 may be used. The aliphatic polyol may be at least one selected from a group consisting of polyethylene glycol, polytetramethylene ether glycol, polypropylene glycol, polycarbonate diol, polycaprolactone diol and an ethylene-propylene glycol copolymer.

In addition, the present disclosure provides a secondary battery electrode containing the electrode binder. The secondary battery electrode may contain carbon-coated lithium iron phosphate (c-LiFePO$_4$).

In addition, the present disclosure provides a secondary battery containing a secondary battery electrode and a nonaqueous electrolyte solution, wherein the nonaqueous electrolyte solution contains a compound of Chemical Formula 1.

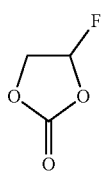

[Chemical Formula 1]

The copolymer of the binder can form a polycarbonate-based by electrode interfacial film by reacting with the compound of Chemical Formula 1.

The content of the binder may be 1-15% by weight of the electrode. The content of the compound of Chemical Formula 1 may be 0.1-7.0% by volume of the nonaqueous electrolyte solution.

Advantageous Effects

The presence of a hard segment capable of hydrogen bonding with carbon-coated lithium iron phosphate, conductive carbon and a current collector material provides high adhesion force between the materials and between an active material layer and the current collector, thus excellent mechanical properties. In addition, due to the presence of a polyol-type soft segment in a binder material, the use of an organic solvent can be reduced and aggregation can be minimized during a slurry production process because dispersion is achieved well.

In addition, if an additive is contained in an electrode and an electrolyte solution containing a carbonate-based additive is used, a strong polycarbonate-based interface layer with excellent ion conductivity can be formed by interacting with the binder. In addition, excellent electrochemical properties can be achieved because resistance at the electrode interface can be reduced when preparing a lithium secondary battery having the binder and the additive applied.

BRIEF DESCRIPTION OF DRAWINGS

FIG. 1 shows the molecular structure of a copolymer according to an embodiment of the present disclosure and a commercial secondary battery binder (PVDF).

FIG. 2 shows the surface functional group XPS analysis result of a carbon-coated lithium iron phosphate material and conductive carbon.

FIG. 3 shows schematic representation of coating of an electrode slurry containing a commercial PVDF binder or a binder of the present disclosure.

FIG. 4 shows photographs showing the result of Test Example 1 wherein the adhesion force of the polymers shown FIG. 1 to an aluminum current collector is investigated.

FIG. 5 shows the result of Test Example 2 wherein the electrochemical stability of the polymers shown in FIG. 1 is investigated.

FIG. 6 is a table showing the result of Test Example 3 wherein electrode thickness after drying as compared to the initial coating thickness and active material content are investigated according to one embodiment of the present disclosure.

FIG. 7 shows the result of Test Example 4 wherein the surface roughness of an electrode according to an embodiment of the present disclosure is measured.

FIG. 8 shows the result of Test Example 5 wherein the cross-sectional adhesion state of an according to one embodiment of the present disclosure is measured.

FIG. 9 shows the result of Test Example 6 wherein electrochemical performance is evaluated in the presence and absence of an additive.

FIG. 10 shows the result of Test Example 7 wherein electrochemical performance is evaluated for different binders.

FIG. 11 shows the result of Test Example 8 wherein the components at an electrode interface after electrochemical reaction are investigated according to one embodiment of the present disclosure.

BEST MODE

Hereinafter, the present disclosure will be described in detail through drawings, examples and test examples so that those of ordinary skill can easily carry out the present disclosure. However, the present disclosure may be embodied in various different forms and the scope of the present disclosure is not limited by them. A battery according to the present disclosure contains a positive electrode, a negative electrode, a separator interposed therebetween, and an electrolyte solution. According to the present disclosure, a copolymer binder containing a hard segment capable of hydrogen bonding with an electrode active material and a current collector and a soft segment having a polyol structure is used as a binder of the positive electrode.

The electrode can improve the output and service life characteristics of the electrode by reducing the interface resistance between the positive electrode active material and between the current collector.

The binder is a copolymer including a hard segment capable of hydrogen bonding in the electrode and a soft segment having a polyol structure.

The copolymer can form a polycarbonate-based electrode interface film by reacting with a compound of Chemical Formula 1 in an electrolyte solution.

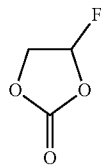

[Chemical Formula 1]

The copolymer may have a number-average molecular weight of 210,000-1,000,000.

The hard segment contains bonds of an aromatic polyurethane and an aromatic urea. As the soft segment, an aliphatic polyol compound having a weight-average molecular weight of 1,000-3,000 may be used. The aliphatic polyol may be at least one selected from a group consisting of polyethylene glycol, polytetramethylene ether glycol, polypropylene glycol, polycarbonate diol, polycaprolactone diol and an ethylene-propylene glycol copolymer.

FIGS. 1a and 1c show the molecular structure of the polymer and a Fourier transform infrared spectroscopy (FT-IR) analysis result for the functional groups of the molecule. The polymer has a structure that can be phase-separated to the soft and hard segments and is capable of hydrogen bonding with the electrode active material through the urea and urethane functional groups of the hard segment. FIGS. 1b and 1d show the molecular structure of a commercial lithium secondary battery binder, polyvinylidene fluoride, and an FT-IR analysis result. It can be seen that only Van der Waals bonding, rather than hydrogen bonding, is possible through the functional groups of the polymer.

FIGS. 2a and 2b show the surface analysis result of a carbon-coated lithium iron phosphate positive electrode active material, and FIGS. 2c and 2d show the surface analysis of conductive carbon by XPS. It can be seen that each material contains carboxyl groups and hydroxyl groups capable of hydrogen bonding on the surface.

FIG. 3 is a diagram for representing the effect of using a copolymer binder when preparing an electrode mixture containing carbon-coated lithium iron phosphate (c-LiFePO$_4$), conductive carbon and the copolymer binder. For the copolymer binder, high coating density can be expected because it is capable of hydrogen bonding with the carboxyl groups and hydroxyl groups on the surface of the electrode active material. Also, excellent adhesion to a current collector can be expected because it is capable of hydrogen bonding with the hydroxyl groups on the surface of an oxidized current collector. On the other hand, for the commercially available polyvinylidene fluoride binder, low active material coating density is expected because adhesion force can be exerted only with van der Waals force. In addition, the adhesion force to the current collector is also low. When considering the difference in adhesion force, the electrode employing the copolymer binder is advantageous in constructing a more flat electrode surface.

In addition, the present disclosure provides a secondary battery electrode containing the electrode binder. The secondary battery electrode may contain carbon-coated lithium iron phosphate (c-LiFePO$_4$).

A positive electrode of the electrode according to the present disclosure contains carbon-coated lithium iron phosphate formed on a positive electrode current collector, and uses the copolymer binder described above as a positive electrode binder.

As the positive electrode current collector, any one that can be used as a current collector in the art may be used. Specifically, aluminum foam, nickel foam, etc. having excellent conductivity may be used.

The conductive material may be a porous material. As the conductive material, any one having porosity and electrically conductivity can be used without limitation. For example, carbonaceous material having porosity may be used. As the carbonaceous material, carbon black, graphite, graphene, activated carbon, carbon fiber, etc. may be used. In addition, metallic fiber such as a metal mesh, etc., metallic powder such as copper, silver, nickel, aluminum, etc., or an organic conductive material such as a polyphenylene derivative, etc. may also be used. The conductive material may be used alone or in combination.

The positive electrode may be prepared according to a conventional method. Specifically, it may be prepared by coating a composition for forming a positive electrode active material layer, wherein a positive electrode active material, the conductive material and the binder is mixed in an organic solvent, drying the same and, optionally, compression-molding the current collector to improve electrode density. As the organic solvent, one that can uniformly disperse the positive electrode active material, the binder and the conductive material may be used. Specifically, one that easily evaporates may be used. Specifically, N-methyl-2-pyrrolidone, acetonitrile, methanol, ethanol, tetrahydrofuran, isopropyl alcohol, etc. may be used.

In addition, a negative electrode of the electrode according to the present disclosure contains a negative electrode active material formed on a negative electrode collector.

Specifically, the negative electrode current collector may be selected from copper, stainless steel, titanium, silver, palladium, nickel, alloys thereof and combinations thereof. The stainless steel may be surface-treated with carbon, nickel, titanium or silver, and an aluminum-cadmium alloy can be used as the alloy. In addition, soft carbon, a non-conducting polymer surface-treated with a conductive material, a conductive polymer, etc. can be used.

As the negative electrode active material, a material capable of reversibly storing (intercalating) or discharging (deintercalating) lithium ions (Li$^+$), a material capable of reversibly forming a lithium-containing compound by reacting with lithium ions, lithium metal or a lithium alloy can be used. The material capable of reversibly intercalating or discharging lithium ions (Li$^+$) may be, for example, crystalline carbon, amorphous carbon or a mixture thereof. The material capable of reversibly forming a lithium-containing compound by reacting with lithium ions (Li$^+$) may be, for example, tin oxide, titanium nitrate or silicon. The lithium alloy may be, for example, an alloy of a metal selected from a group consisting of lithium (Li), sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The negative electrode may further contain a binder for binding the negative electrode active material with the conductive material and the current collector. Specifically, the binder may be the same as the binder described above for the positive electrode.

Furthermore, a separator can be interposed between the positive electrode and the negative electrode. As the separator, a commonly used separator can be used without particular limitation as long as it is capable of physically separating the electrode. Specifically, one which exhibits low resistance to ion mobility in the electrolyte solution and has superior ability of absorbing the electrolyte solution may be used.

The separator separates or insulates the positive electrode and the negative electrode and enables transport of lithium ions between the positive electrode and the negative electrode. The separator may be made of a porous and non-conductive or insulating material. The separator may be either an independent member such as a film, or a coating layer added to the positive electrode and/or the negative electrode.

Specifically, a porous polymer film, for example, a porous polymer film prepared from a polyolefin-based polymer such as an ethylene homopolymer, a propylene homopolymer, an ethylene/butene copolymer, an ethylene/hexene copolymer, an ethylene/methacrylate copolymer, etc. may be used either alone or by stacking them. Alternatively, a conventional porous nonwoven fabric, for example, a nonwoven fabric made from a high-melting-point glass fiber, a polyethylene terephthalate fiber, etc. may be used, although not being limited thereto.

In addition, the present disclosure provides a secondary battery containing the secondary battery electrode described above and a nonaqueous electrolyte solution.

The nonaqueous electrolyte solution contains a compound of Chemical Formula 1.

[Chemical Formula 1]

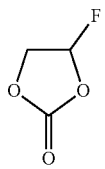

The content of the compound of Chemical Formula 1 may be 0.1-7.0% by volume of the nonaqueous electrolyte solution.

Further, the nonaqueous electrolyte solution contains a lithium salt and a solvent. As the solvent, a nonaqueous organic solvent, an organic solid electrolyte, an inorganic solid electrolyte, etc. may be used.

The lithium salt may be a material that can be easily dissolved in a non-aqueous organic solvent. For example, it may be at least one selected from a group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, lithium chloroborate, a lithium lower aliphatic carbonate, lithium tetraphenylborate and an imide.

The concentration of the lithium salt may be 0.1-4.0 M, specifically 0.5-2.0 M, depending on various factors such as the exact composition of the electrolyte mixture, salt solubility, the conductivity of the dissolved salt, battery charge and discharge conditions, operation temperature and other factors known in the lithium-sulfur battery field. If the concentration of the lithium salt is below the above range, the battery performance may be unsatisfactory due to decreased conductivity of the electrolyte solution. And, if it is higher than the range, the mobility of lithium ions (Li$^+$) may be reduced as the viscosity of the electrolyte solution increases. A suitable concentration is selected adequately from the above range.

As the non-aqueous organic solvent, a material that can dissolve the lithium salt well, specifically, an aprotic organic solvent such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, 1-ethoxy-2-methoxyethane, tetraethylene glycol dimethyl ether, tetrahydrofuran, 2-methyltetrahydrofuran, dimethyl sulfoxide, 1,3-dioxolane, 4-methyl-1,3-dioxene, diethyl ether, formamide, dimethylformamide, dioxolane, acetonitrile, nitromethane, methyl formate, methyl acetate, triester of phosphoric acid, trimethoxy methane, a dioxolane derivative, sulfolane, methylsulfolane, 1,3-dimethyl-2-imidazolidinone, a propylene carbonate derivative, a tetrahydrofuran derivative, an ether, methyl propionate, ethyl propionate, etc. may be used either alone or in combination.

Specifically, as the organic solid electrolyte, a polyethylene derivative, a polyethylene oxide derivative, a polypropylene oxide derivative, a phosphoric acid ester polymer, polylysine, polyester sulfide, polyvinyl alcohol, polyvinylidene fluoride, a polymer containing an ionic dissociable group, etc. may be used.

Specifically, as the inorganic solid electrolyte of the present disclosure, a nitride, halide, sulfate, etc. of Li such as Li$_3$N, LiI, Li$_5$NI$_2$, Li$_3$N—LiI—LiOH, LiSiO$_4$, LiSiO$_4$-LiI-LiOH, Li$_2$SiS$_3$, Li$_4$SiO$_4$, Li$_4$SiO$_4$—LiI—LiOH, Li$_3$PO4-Li$_2$S—SiS$_2$, etc. may be used.

The copolymer of the binder can form a polycarbonate-based electrode interface film by reacting with the compound of Chemical Formula 1, and the content of the binder may be 1-15% by weight of the electrode.

Mode for Invention

Test Example 1

Testing of Adhesion Force of Polymer Film to Metal Current Collector

FIG. 4 shows an experimental result for confirming the adhesion force of a binder material to a metal current collector. Each polymer film sample was prepared by coating an aluminum foil as a positive electrode current collector and then drying at 80° C. for 12 hours. It was confirmed that the copolymer binder film proposed in the present disclosure has significantly better adhesion force than the PVDF film used in the existing commercial battery.

Test Example 2

Evaluation of Electrochemical Stability of Polymer Film

FIG. 5 shows an electrochemical test result for the polymer film-type binder material. Each polymer film sample was prepared as a lithium metal coin half-cell structure, and was measured at a rate of 0.1 mV/s in a range of 0.05-4.0 vs. Li/Li$^+$. It was confirmed that the copolymer binder presented in the present disclosure is electrochemically stable in the corresponding voltage range.

Example 3

Comparison of Physical Properties of Slurry Depending on Binder

FIG. 6 shows a result of testing the physical properties of a slurry depending on the binder. Each slurry was prepared by mixing carbon-coated lithium iron phosphate, conductive carbon, a binder and an N-methylpyrrolidone solvent, and the physical properties were compared for the same viscosity. Although the thickness after the first coating was equal as 300 μm, the electrode thickness after the drying and the copolymer loading amount were significantly higher for the copolymer binder, due to the strong hydrogen bonding strength with the active material of the binder.

Example 4

Analysis of Electrode Surface Depending on Binder

FIG. 7 shows a result of testing the surface roughness of an electrode depending on the binder. The surface roughness of the electrode was measured by laser scanning microscopic (LSM) measurement, and the surface roughness of the electrode was imaged by scanning electron microscopic (SEM) measurement. It was confirmed that the electrode employing the copolymer binder has a smoother electrode surface, due to the excellent interaction between the binder and the active material.

Experimental Example 5

Analysis of Adhesion Force at Electrode Cross Section Depending on Binder

FIG. 8 shows a result of analyzing the cross section of an electrode and conducting peel test for the electrode. The cross section of the electrode was investigated by SEM and the adhesion force of the electrode was measured quantitatively by mechanical peeling test. It was confirmed that the electrode employing the copolymer binder has better adhesion force to the copper current collector.

Example 6

Analysis of Electrochemical Characteristics Depending on Presence or Absence of Additive FIG. 9 shows a result of evaluating the electrochemical characteristics of the electrode prepared by using a copolymer binder depending on the presence or absence of a carbonate-based additive. A lithium secondary battery was prepared under the same condition, and the cycle characteristics of the secondary battery was evaluated depending on the presence or absence of the additive. As a result, it was confirmed that the service life and output characteristics was better when the additive was used.

Example 7

Analysis of Electrochemical Characteristics Depending on Binder

FIG. 10 shows a result of evaluating electrochemical characteristics depending on the type of a binder. A lithium secondary battery was prepared under the same condition, and electrochemical experiment was conducted under the same condition by using an electrolyte solution containing a carbonate-based additive.

As a result, it was confirmed that the electrode using the copolymer binder exhibits better used greater output characteristics as current density increases, as compared to the electrode using the control binder, and exhibits superior electrochemical performance even in 0.5 C life characteristics evaluation.

Example 8

Surface Characterization of Discharged Electrode

FIG. 11 shows a result of measuring the functional groups on the electrode surface depending on the binder type and electrochemical cycles. A lithium secondary battery was prepared under the same condition except for the binder, and the measurement was carried out for the functional groups on the electrode surface under the same condition.

As a result, it was confirmed that the electrode using the copolymer binder exhibits formation of less electrolyte (O1s 531-534 eV) and lithium salt (F1s) byproducts as compared to the control electrode. Also, through the c-LiFePO$_4$ peak change before and after electrochemical cycles, it was confirmed that the thinnest interface film is formed in the electrode using the copolymer binder.

INDUSTRIAL APPLICABILITY

The present disclosure is highly industrially applicable because it can be applied to a lithium secondary battery.

The invention claimed is:

1. A polymer binder for a secondary battery electrode, wherein the polymer binder is a copolymer containing a hard segment capable of hydrogen bonding in the electrode and soft segment having a polyol structure,
    wherein the hard segment comprises a urethane group bonded to a first aromatic group and a urea group bonded to a second aromatic group.

2. The polymer binder for a secondary battery electrode according to claim 1, wherein the copolymer forms a polycarbonate-based electrode interface film by reacting with a compound of Chemical Formula 1 in an electrolyte solution:

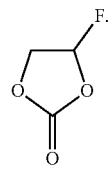

[Chemical Formula 1]

3. The polymer binder for a secondary battery electrode according to claim 1, wherein the copolymer has a number-average molecular weight of 210,000-1,000,000.

4. The polymer binder for a secondary battery electrode according to claim 1, wherein the soft segment is an aliphatic polyol compound having a weight-average molecular weight of 1,000-3,000.

5. The polymer binder for a secondary battery electrode according to claim 4, wherein the aliphatic polyol is at least one selected from a group consisting of polyethylene glycol, polytetramethylene ether glycol, polypropylene glycol, polycarbonate diol, polycaprolactone diol and an ethylene-propylene glycol copolymer.

6. The secondary battery electrode comprising the polymer binder for a secondary battery electrode according to claim 1.

7. The secondary battery electrode according to claim 6, wherein the secondary battery electrode comprises carbon-coated lithium iron phosphate (c-LiFePO$_4$).

8. A secondary battery comprising:
    the secondary battery electrode according to claim 6; and
    a nonaqueous electrolyte solution,
    wherein the nonaqueous electrolyte solution comprises a compound of Chemical Formula 1:

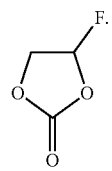

[Chemical Formula 1]

9. The secondary battery according to claim 8, wherein the copolymer of the binder forms a polycarbonate-based electrode interface film by reacting with the compound of Chemical Formula 1.

10. The secondary battery according to claim 8, wherein the polymer binder is comprised in 1-15% by weight of the electrode.

11. The secondary battery according to claim 8, wherein the content of the compound of Chemical Formula 1 in the nonaqueous electrolyte solution is 0.1-7.0% by volume.

* * * * *